United States Patent
Langheim

(10) Patent No.: US 9,123,978 B2
(45) Date of Patent: Sep. 1, 2015

(54) METHOD AND DEVICE FOR EXTENDING THE LIFETIME OF A BATTERY IN PARTICULAR OF A VEHICLE

(71) Applicant: STMicroelectronics SA, Montrouge (FR)

(72) Inventor: Jochen Langheim, Viroflay (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 14/339,743

(22) Filed: Jul. 24, 2014

(65) Prior Publication Data

US 2014/0335383 A1 Nov. 13, 2014

Related U.S. Application Data

(62) Division of application No. 13/491,414, filed on Jun. 7, 2012, now Pat. No. 8,852,770.

(30) Foreign Application Priority Data

Jun. 8, 2011 (FR) ...................................... 11 54995

(51) Int. Cl.
  *H01M 10/48* (2006.01)
  *H01M 2/20* (2006.01)
  *H01M 2/34* (2006.01)
(52) U.S. Cl.
  CPC ................. *H01M 10/48* (2013.01); *H01M 2/20* (2013.01); *H01M 2/34* (2013.01); *H01M 2/348* (2013.01); *H01M 10/488* (2013.01); *H01M 2200/00* (2013.01); *H01M 2220/20* (2013.01)
(58) Field of Classification Search
  None
  See application file for complete search history.

(56) References Cited

U.S. PATENT DOCUMENTS

| 5,227,259 A | 7/1993 | Weaver et al. |
| 5,800,937 A | 9/1998 | Decker et al. |
| 2003/0027036 A1 | 2/2003 | Emori et al. |
| 2007/0207358 A1 | 9/2007 | Obika |
| 2010/0247987 A1 | 9/2010 | Holung et al. |
| 2011/0039147 A1 | 2/2011 | Cheon et al. |

FOREIGN PATENT DOCUMENTS

| EP | 0 926 796 A2 | 6/1999 |
| EP | 2 284 929 A1 | 2/2011 |
| JP | 2009076270 | 4/2009 |

OTHER PUBLICATIONS www.thesaurus.com entry for explode (printed from the Internet on Jan. 13, 2013).
www.thesaurus.com entry for melt (printed from the Internet on Jan. 13, 2013).
Katsuaki et al. (JP 2009-076270) (a raw machine translation).
Motion System Design article [http://www.parkermotion.com/whitepages/motion_technology_comparison.pdf (published Nov. 1, 2007).

*Primary Examiner* — Miriam Stagg
*Assistant Examiner* — Carmen Lyles-Irving
(74) *Attorney, Agent, or Firm* — Seed IP Law Group PLLC

(57) ABSTRACT

A method includes coupling two conducting rods between terminals of a battery cell of a battery having several branches coupled in parallel, each branch having several battery cells coupled in series. A force tending to squeeze the rods against each other is applied, with the rods being held apart from each other using an insulating block. At least one operating state signal of the cell is monitored, and the insulating block is removed based on the monitoring, allowing the rods to come into electrical contact and short-circuit the battery cell.

18 Claims, 4 Drawing Sheets

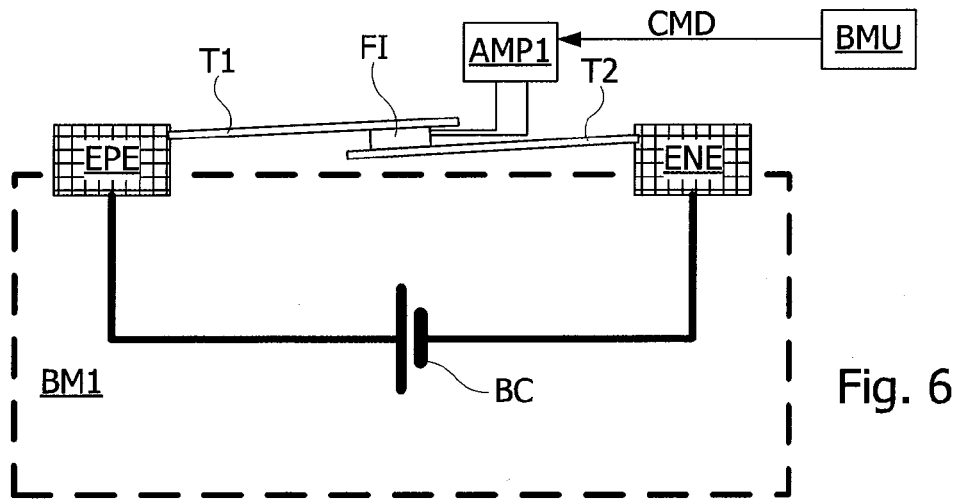
Fig. 6
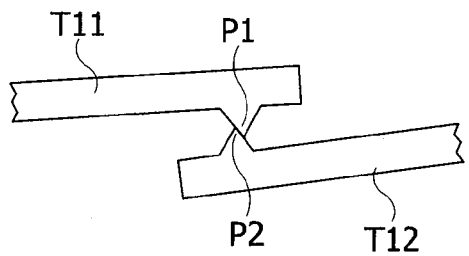
Fig. 7B
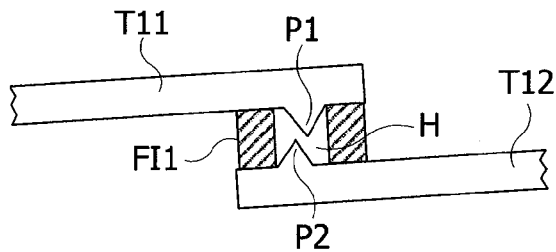
Fig. 7A
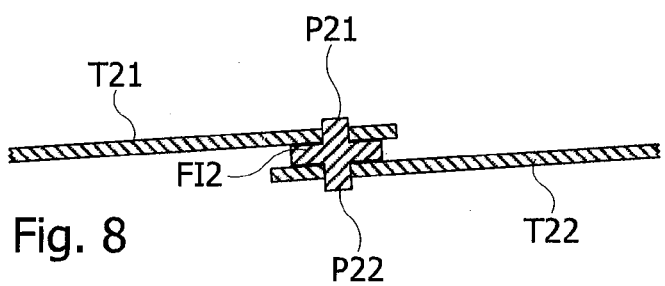
Fig. 8
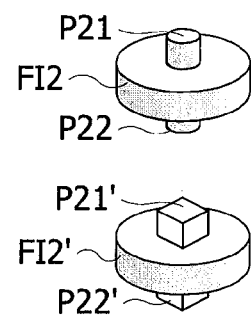
Fig. 8A
Fig. 8B

METHOD AND DEVICE FOR EXTENDING THE LIFETIME OF A BATTERY IN PARTICULAR OF A VEHICLE

BACKGROUND

1. Technical Field

The present disclosure relates to the management of a rechargeable battery comprising a plurality of cells connected in series and possibly in parallel. The present disclosure applies, for example, but not exclusively to the batteries of electric or hybrid vehicles.

2. Description of the Related Art

An electric vehicle uses only an electric engine powered by a propulsion battery to be propelled. The propulsion battery of an electric vehicle is charged by a source of electrical energy external to the vehicle. A hybrid vehicle comprises both an electric engine and an internal combustion engine to be propelled. The electric engine of a hybrid vehicle is powered by a propulsion battery which is charged by the internal combustion engine. The propulsion battery of some hybrid vehicles may also be charged by a source of electrical energy external to the vehicle.

The propulsion battery of an electric or hybrid vehicle typically comprises several parallel branches of several dozens to several hundreds of cells connected in series. Such a battery has a relatively high cost, which may reach half the price of the vehicle in which it is installed. It is therefore desirable to extend as much as possible the duration of use of such a battery.

A faulty cell may not conduct electrical current any longer. The result is that all the other cells of the same branch, i.e., those connected in series with the faulty cell, are disconnected from the battery circuit. Consequently, the battery looses a capacity corresponding to that of a branch of cells. For example, if the battery comprises four branches of four cells, one faulty cell may cause a loss of capacity of 25% instead of a loss of capacity of 6.25% corresponding to the loss of a single cell. In addition, if a whole branch of cells is faulty, the battery may not be able to supply enough electrical current to power a propulsion engine of vehicle. It is then necessary to replace the battery.

BRIEF SUMMARY

An embodiment relates to a method for protecting a battery comprising several branches connected in parallel, each branch comprising several battery cells connected in series, the method comprising connecting between them two terminals of each cell by electrically conducting rods on which a force tending to squeeze the rods against each other is applied, maintaining the rods apart from each other using an insulating block, monitoring at least one operating state signal of each cell, and if one condition is achieved by the monitored state signal of a cell, retracting the insulating block to let the rods slowly squeeze against each other, and thus establish a short-circuit between the terminals of the battery cell.

According to one embodiment, retracting the insulating block is performed by melting, pulverizing under the effect of an explosion or moving the insulating block.

According to one embodiment, the monitored state signal of each cell is representative of at least one of the physical quantities of the group comprising an intensity of current flowing through the cell, a voltage between the terminals of the cell, an impedance between the terminals of the cell, and a temperature of the cell.

According to one embodiment, retracting the insulating block is performed upon detecting that the intensity of the current flowing through the cell is lower than a current intensity threshold, and/or detecting that the voltage between the cell terminals is higher than a voltage threshold, and/or detecting that the impedance between the cell terminals is higher than an impedance threshold, and/or detecting that the temperature of the cell is higher than a temperature threshold.

According to one embodiment, the insulating block is retracted by melting by electrically powering a heating element connected to the insulating block, or by sending an electrical signal to an explosive element connected to the insulating block, or by sending a control signal to an electromechanical actuator configured to move the insulating element to a position where it does not prevent the conductors from coming into contact with each other.

Embodiments also may relate to a device for protecting a battery, the device comprising electrically conducting rods connected to two connection terminals of a cell of the battery, and on which a force tending to squeeze them against each other is applied, an insulating block keeping the rods away from each other against the force, an element configured to retract the insulating block under the effect of a control signal, so as to let the rods squeeze against each other, and thus establish a short-circuit between the terminals of the battery cell, and a control circuit configured to monitor at least one operating state signal of the cell, and to control the element for retracting the insulating block if a condition is achieved by the monitored state signal.

According to one embodiment, the insulating block is in a fusible material and connected to an electrically powered heating element, or connected to an element, explosive under the effect of an electrical signal, susceptible of pulverizing it, or is connected to an electromechanical actuator susceptible of moving it to a position where it does not prevent the rods from coming into contact with each other.

According to one embodiment, the insulating block has one or more holes provided to receive a part belonging to each rod.

According to one embodiment, each rod has a hole provided to receive a part belonging to the insulating block.

According to one embodiment, the device comprises one or two springs engaged on another rod going through the rods, the springs being arranged to squeeze the rods against the insulating element.

According to one embodiment, the state signal monitored by the control circuit is representative of at least one of the physical quantities of the group comprising an intensity of current flowing through the cell, a voltage between the terminals of the cell, an impedance between the terminals of the cell, and a temperature of the cell.

According to one embodiment, the control circuit is configured to control the retraction of the insulating block upon detecting that the intensity of the current flowing through the cell is lower than a current intensity threshold, and/or detecting that the voltage between the cell terminals is higher than a voltage threshold, and/or detecting that the impedance between the cell terminals is higher than an impedance threshold, and/or detecting that the temperature of the cell is higher than a temperature threshold.

Embodiments also may relate to a battery comprising several branches connected in parallel, each branch comprising several battery cells connected in series, the device comprising for each cell a protection device according to the present disclosure.

According to one embodiment, each cell comprises sensors providing measure signals relating to the operating state of the cell and a control circuit receiving the measure signals from the sensors and configured to control the retraction of the insulating block as a function of the measure signals.

According to one embodiment, the control circuit is configured to receive state signals of the battery cells and to control the retraction of the insulating block of the device for protecting one of the battery cells as a function of the state signals received from the battery cell.

In an embodiment, a method comprises coupling two conducting rods between terminals of a battery cell of a battery, the battery including several branches coupled in parallel, each branch having several battery cells coupled in series; applying a force tending to squeeze the rods against each other; maintaining the rods apart from each other using an insulating block; monitoring at least one operating state signal of the cell; and selectively removing the insulating block based on the monitoring. In an embodiment, removing the insulating block comprises at least one of melting, pulverizing under the effect of an explosion, and moving the insulating block. In an embodiment, the monitored state signal of the cell is representative of at least one of an intensity of current flowing through the cell, a voltage between the terminals of the cell, an impedance between the terminals of the cell, and a temperature of the cell. In an embodiment, removing the insulating block is performed upon at least one of detecting that an intensity of the current flowing through the cell is lower than a current intensity threshold, detecting that a voltage between the cell terminals is higher than a voltage threshold, detecting that an impedance between the cell terminals is higher than an impedance threshold, and detecting that a temperature of the cell is higher than a temperature threshold. In an embodiment, removing the insulating block includes at least one of electrically powering a heating element, sending an electrical signal to an explosive element, and sending a control signal to an electromechanical actuator configured to move the insulating element. In an embodiment, the method comprises: coupling two conducting rods between terminals of a second battery cell of the battery; applying a force tending to squeeze the rods coupled between terminals of the second cell of the battery against each other; maintaining the rods coupled between the terminals of the second cell of the battery apart from each other using a second insulating block; monitoring at least one operating state signal of the second cell, and selectively removing the second insulating block based on the monitoring of the second cell to let the rods coupled between the terminals of the second cell squeeze against each other.

In an embodiment, a device comprises electrically conducting rods configured to couple to connection terminals of a cell of a battery, with a force tending to squeeze the conducting rods together; an insulating block configured to keep the rods from making electrical contact with each other; a block disable element configured to disable the insulating block in response to a control signal; and a controller configured to monitor at least one operating state signal of the cell, and to generate the control signal based on the monitoring. In an embodiment, the block comprises a fusible material and the block disable element comprises an electrically powered heating element. In an embodiment, the block disable element comprises an explosive configured to explode in response to the control signal. In an embodiment, the block disable element is configured to respond to the control signal by pulverizing the insulating block. In an embodiment, the block disable element comprises an electromechanical actuator configured to move the block to a position where the block does not prevent the rods from coming into contact with each other. In an embodiment, the insulating block has one or more holes configured to receive a part of a rod. In an embodiment, each rod has a hole configured to receive a part of the insulating block. In an embodiment, the device comprises one or more springs engaged on another rod going through the conducting rods, the springs being arranged to squeeze the rods against the insulating block. In an embodiment, the state signal monitored by the controller is representative of at least one of an intensity of current flowing through the cell, a voltage between the terminals of the cell, an impedance between the terminals of the cell, and a temperature of the cell. In an embodiment, the controller is configured to generate the control signal based on at least one of detecting that an intensity of a current flowing through the cell is lower than a current intensity threshold, detecting that a voltage between the cell terminals is higher than a voltage threshold, detecting that an impedance between the cell terminals is higher than an impedance threshold, and detecting that a temperature of the cell is higher than a temperature threshold.

In an embodiment, a battery comprises a plurality of battery cells; and a plurality of battery cell branches coupled in parallel, each branch including one or more of the plurality of battery cells coupled in series, wherein each battery cell of the plurality includes: electrically conducting rods configured to couple to connection terminals of the battery cell, with a force tending to squeeze the conducting rods together; an insulating block configured to keep the rods from making electrical contact with each other; and an insulating block disable element configured to disable the insulating block. In an embodiment, each battery cell comprises sensors providing measure signals relating to the operating state of the cell and a control circuit receiving the measure signals from the sensors and configured to control the insulating block disable element as a function of the measure signals. In an embodiment, the battery comprises a controller configured to receive state signals related to states of the battery cells and to control an insulating block disable element of a respective battery cell based on one or more state signals related to the respective battery cell.

BRIEF DESCRIPTION OF THE SEVERAL VIEWS OF THE DRAWINGS

Embodiments will be described hereinafter, in relation with, but not limited to the appended figures wherein:

FIGS. 5 and 6 schematically show the circuits of the battery module provided with the protection device, according to various embodiments;

FIGS. 7A and 7B schematically show in longitudinal section, a part of the protection device in two different states, according to another embodiment;

FIG. 8 schematically shows in longitudinal section, a part of the protection device, according to another embodiment;

FIGS. 8A and 8B schematically show in perspective a part of the protection device of FIG. 8, according to various embodiments;

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, battery cells, processor cores, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
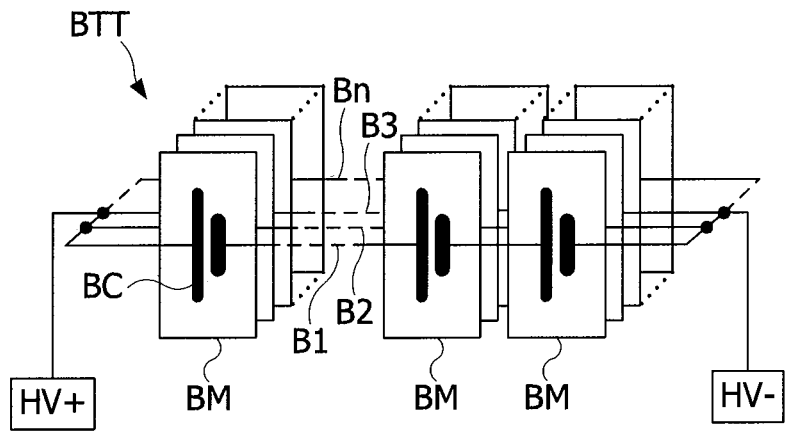
FIG. 1 schematically shows a battery such as a propulsion battery of a vehicle.

FIG. 1 shows a battery such as a propulsion battery of vehicle. The battery BTT comprises several branches B1, B2, B3, . . . Bn connected in parallel. Each branch B1-Bn comprises several battery modules BM connected in series, and is connected to two ends respectively to positive HV+ and negative HV− battery terminals. Each module BM comprises one or more battery cells BC.

Figure 2:
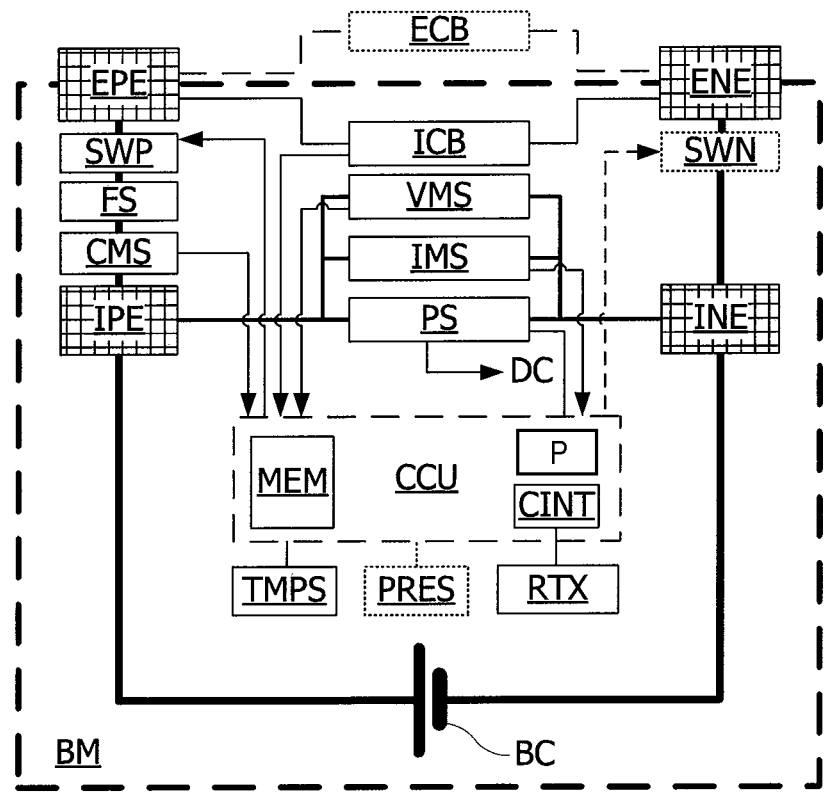
FIG. 2 schematically shows circuits of a battery module comprising a battery cell, according to one embodiment.

FIG. 2 shows a battery module BM. In the example of FIG. 2, the module BM comprises a single battery cell BC comprising positive IPE and negative INE internal terminals. The module BM comprises a control unit CCU and a current intensity sensor CMS connected to the terminal IPE and a protection fuse FS. The fuse FS is connected to an external positive terminal EPE for connecting the cell BC through a switch SWP. The negative terminal INE is also connected to an external negative terminal ENE for connecting the cell BC, possibly through a switch SWN.

The module BM comprises an internal power supply circuit PS, and impedance measurement IMS and voltage measurement VMS circuits, connected between the terminals IPE and INE. The module BM may also comprise an internal balancing circuit ICB connected between the terminals EPE and ENE. This circuit may be replaced by an external balancing circuit ECB.

The control unit CCU of the module BM which may comprise a microcontroller P, is powered by the circuit PS, and is connected to a temperature sensor TMPS and possibly to a pressure sensor PRES, providing temperature and pressure measures of the cell BC. The unit CCU comprises a memory MEM and possibly a communication interface CINT connected to a wireless or wired transmission circuit, for example of radiofrequency or Bluetooth type, to communicate with a central unit of the battery BTT. The unit CCU is configured to determine charge and operating states of each cell of the module BM, from the measures provided by the sensors CMS, VMS, IMS, TMPS and PRES, and to control the switches SWP and SWN of each cell as a function of the operating state of the cell.

Figure 3A:
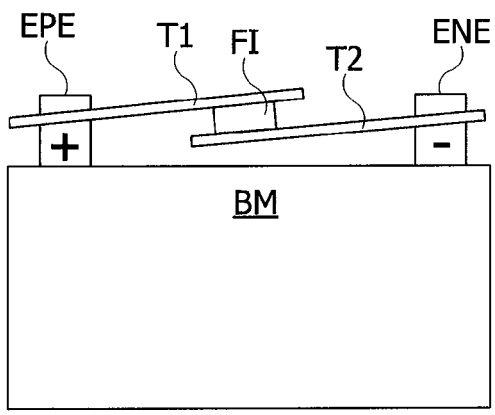
FIGS. 3A and 3B schematically show the battery module provided with a protection device in two different states, according to one embodiment.
Figure 3B:
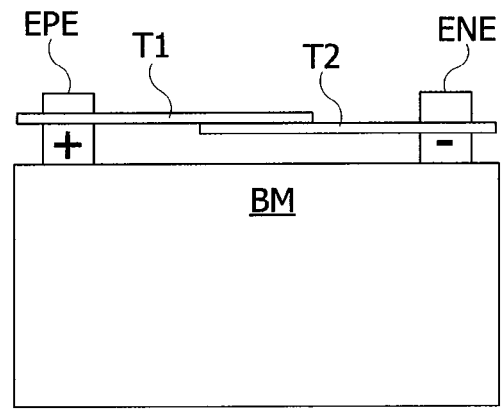

According to one embodiment shown by FIGS. 3A, 3B, each module BM of the battery BTT comprises a protection device allowing a short-circuit between the terminals EPE, ENE of the module BM to be established when a condition is achieved about the state of the module BM, for example when the current between the terminals EPE, ENE is lower than a threshold. To that end, the protection device may comprise two electrically conductive rods T1, T2, each being connected by an end to a respective terminal EPE, ENE of the module BM or a battery cell BC. At the other, free end, both rods are maintained apart by an electrically insulating block FI, against a force causing both rods to come into contact with each other. When a condition for triggering the protection device is achieved, the block FI may be removed (e.g., retracted, destroyed, melted, etc) under the effect of a control signal, causing the free ends of the rods T1, T2 to come into contact with each other (FIG. 3B). To that end, both rods may be mechanically prestressed to be in contact with each other in the absence of the block FI and may be flexible.

That way, the module BM and therefore the cell BC, may be short-circuited, which allows current circulation to be maintained in the branch B1-Bn of the battery, to which the module BM belongs even if it is faulty.

Triggering the protection device and therefore short-circuiting a cell BC may result from detecting a current intensity between the terminals of the cell BC, lower than a certain threshold, a voltage between these terminals, higher than a certain threshold, an impedance between these terminals, higher than a certain threshold, or a temperature of the cell, higher than a certain threshold, a pressure of the cell higher than a threshold, etc.

Figure 4:
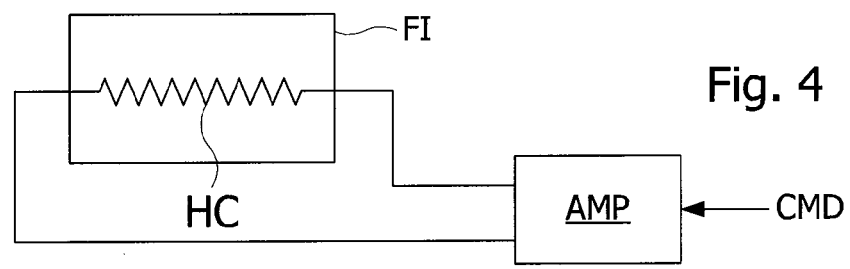
FIG. 4 shows a control circuit of the protection device, according to one embodiment.

FIG. 4 shows a control circuit of the protection device, according to one embodiment. In FIG. 4, the block FI is made in a fusible material, and associated to a heating electric element HC powered by an amplification circuit AMP as a function of a control signal CMD. When the signal CMD is active, the circuit AMP supplies to the element HC enough current to bring it to a temperature susceptible of making the block FI melt. The circuit AMP may stay active until the electrical contact between both rods T1, T2 is established. The circuit AMP may admittedly be activated and deactivated as a function of the state of the signal CMD or be activated and deactivated after the apparition of pulses in the signal CMD.

The heating element HC may be a heating resistor, a piezoelectric or Peltier effect element, etc. The block FI may be made in paraffin, plastic matter or any other electrically insulating material which is fusible at the temperature generated by the heating element HC.

The block FI may also be made in an explosive material or be connected to an element in such a material, and associated to an electric element able to trigger the explosion of the explosive material, and thus pulverize the block FI, under the effect of the electrical control signal CMD.

Figure 5:
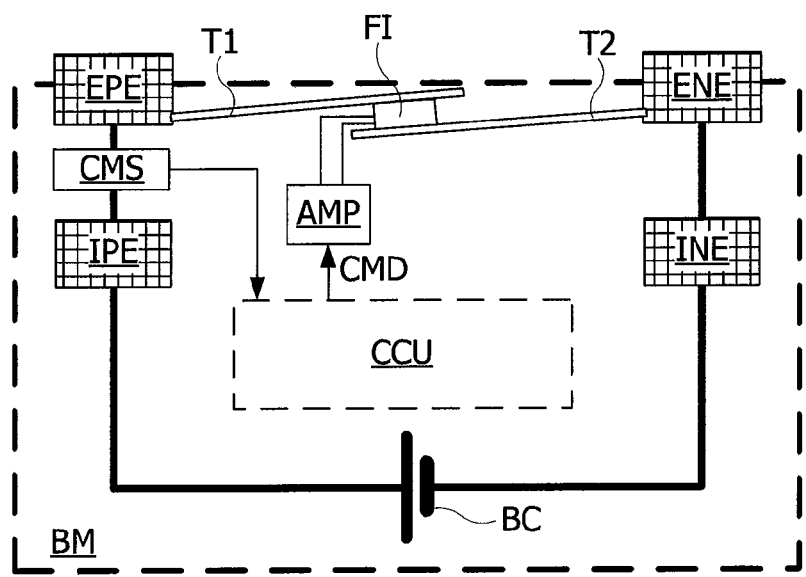

FIGS. 5 and 6 show circuits of the battery module BM provided with the protection device, according to various embodiments. For illustrative clarity, only some elements shown in FIG. 2 have been reproduced in FIGS. 5 and 6, although all these elements may be present. In the embodiment shown by FIG. 5, the circuit AMP able to trigger the retraction of the block FI is controlled by the unit CCU of the module BM. The condition of activation of the circuit AMP and the electrical contact between the rods T1, T2 may be detected for example using the sensor CMS, the voltage sensor VMS or the impedance sensor IMS.

In the embodiment shown by FIG. 6, the element able to trigger the retraction of the block FI is controlled by a circuit AMP1 external to the module BM. The set of the rods T1, T2 and the block FI may also be mounted outside the module BM, for example after manufacturing, and in particular to equip batteries already mounted into vehicles. The circuit AMP1 receives a control signal CMD from an external circuit, for example a battery control unit BMU connected to each of the modules BM of the battery BTT, and receiving the measures from the sensors of each module BM. When the unit BMU detects a condition of activation of the circuit AMP1 from the measures received, it activates the circuit AMP1 until the contact between both rods T1, T2 is detected according to the measures received.

It is to be noted that when the terminals EPE, ENE of the battery module BM are in short-circuit, the power supply circuit PS of the internal circuits of the module BM may not generate a power supply voltage DC any longer. It may therefore be provided that the module BM comprises additional connection terminals or an induction power supply coil, allowing its internal circuits to be electrically powered.

FIGS. 7A, 7B show the free ends of the two rods of the protection device, according to one embodiment. In FIG. 7A, the protection device comprises two rods T11, T12, each having at their free ends a part P1, P2 such as a tip, provided to penetrate into a hole H formed in an insulating block FI1. In normal operating position, the free ends of both rods T11, T12 are maintained apart by the block FI1 into which the tips P1, P2 simultaneously penetrate. After the retraction of the block FI1 (FIG. 7B), the tips P1, P2 are in contact with each other, establishing a short-circuit between the terminals EPE, ENE of the cell BC. Thanks to the presence of the tips P1, P2 and the hole H, the block FI1 does not risk sliding for example under the effect of vibrations.

FIG. 8 shows the free ends of the two rods of the protection device, according to one embodiment. In FIG. 8, the protection device comprises two rods T21, T22, each having at their free ends a hole provided to receive a pin P21, P22 formed in an insulating block FI2. The pins P21, P22 and the holes formed in the free ends of the rods T21, T22 also allow the block FI2 to be better maintained between the rods T21, T22. The shapes of the holes formed in the free ends of the rods T21, T22 may be circular.

FIGS. 8A, 8B show various example embodiments of the block FI2 shown in FIG. 8. In FIG. 8A, the block FI2 has a cylindrical main part, the pins P21, P22 also being cylindrical and formed on opposite plane faces of the main part of the block FI2. FIG. 8B shows a fusible block FI2' which differs from the block FI2 in that it has parallelepiped pins P21', P22'. The shapes of the holes formed in the free ends of the rods T21, T22 may be rectangular.

Figure 9:
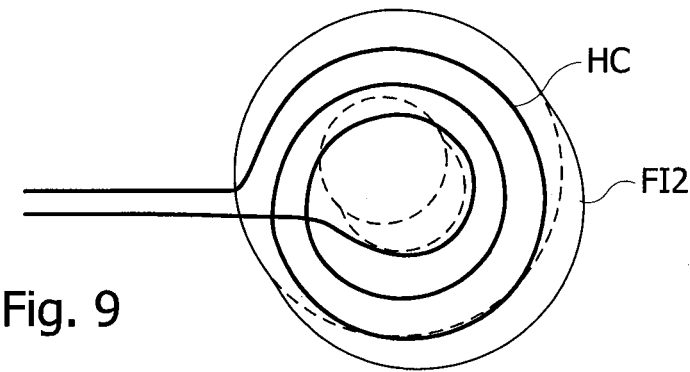
FIG. 9 schematically shows in transversal section, the part of the protection device shown in FIG. 8A.

FIG. 9 shows the block FI2, and in particular, an embodiment of the heating element HC. In FIG. 9, the element HC comprises a spiral wire embedded into the block FI2.

Figure 10:
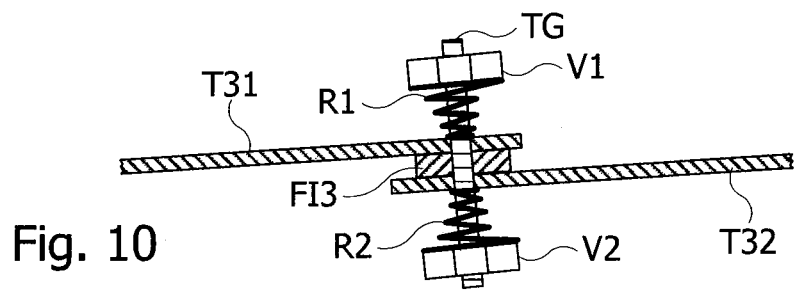
FIG. 10 schematically shows in longitudinal section, a part of the protection device, according to another embodiment.

In the embodiments previously described, the rods T1, T2, T11, T12, T21, T22 of the protection device may be flexible and fixed so as to be subjected to a mechanical prestress, so that when the insulating block is retracted, they are squeezed against each other. FIG. 10 shows the free ends of both rods of the protection device, according to another embodiment in which both rods are not necessarily flexible, or mechanically prestressed at their ends connected to the terminals EPE, ENE of the cell BC. In FIG. 10, the protection device comprises two rods T31, T32, each having at their free ends a hole in which a rod TG is engaged. The rod TG thus goes through both rods T31, T32 and an insulating block FI3 arranged between them. Both rods T31, T32 are squeeze against each other by one or more helical springs R1, R2 engaged on the rod TG and each squeezed against a rod T31, T32 by a nut V1, V2 screwed on the rod TG which is then threaded, or by other mechanical means, for example a clip. The use of a threaded rod and nuts V1, V2 allows the tightening torque of both rods T31, T32 against the block FI3 to be adjusted. In addition, it is to be noted that the rod may be attached to the block FI3.

Figure 11A:
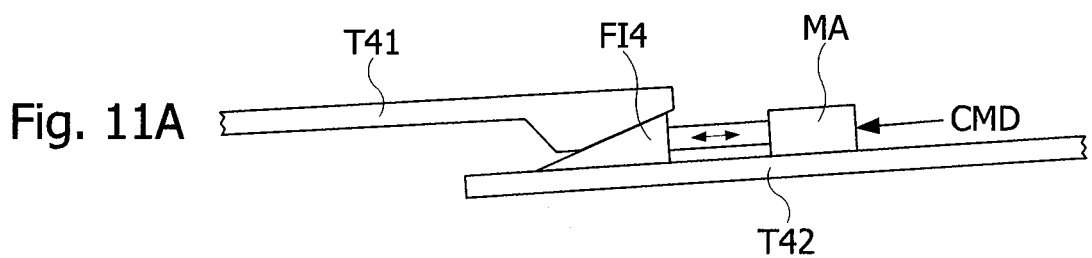
FIGS. 11A, 11B show a part of the protection device, according to another embodiment, in open and contact positions.
Figure 11B:
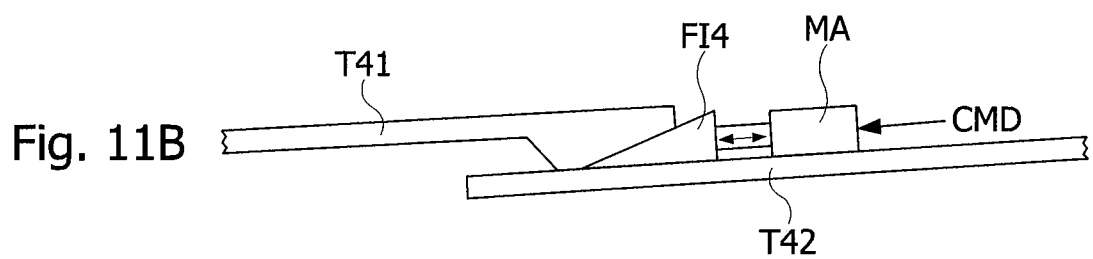

FIGS. 11A, 11B show the free ends of the two rods of the protection device, according to another embodiment. In this embodiment, the retraction of the insulating block and therefore putting both rods of the protection device into contact is performed by an electrically controlled electromechanical actuator. The protection device comprises two rods T41, T42, i.e., a rod T41 having an inclined plane at its free end, and a rod T42 having a face facing the inclined plane of the rod T41, on which an insulating block FI4 may slide. The block FI4 has a ramp provided to slide on the inclined plane of the rod T41, and thus to put the rods apart or let them squeeze against each other under the effect of a mechanical prestress. The block FI4 is coupled to an actuation element MA arranged to make it slide on the rod T42. The element MA may be controlled by the control signal CMD to make the block FI4 slide, between a position where both rods T41, T42 are maintained apart (FIG. 11A), and a position where the contact between both rods T41, T42 is established (FIG. 11B).

It will be clear to those skilled in the art that the present disclosure is susceptible of various embodiments and applications. In particular, the disclosure is not limited to the embodiments previously described, but also includes the possible combinations of these embodiments. Thus, the prestress means described in the embodiment of FIG. 10 may be implemented in the embodiments of FIGS. 7A, 7B, 8 and 11. In the embodiment of FIG. 11, arrangements may be taken not to hinder the sliding movements of the insulating block FI4. For example, it may be provided that the rod TG does not pass through the block FI4 or that the block FI4 has an oblong hole allowing it to slide despite the presence of the rod TG in this hole.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   coupling two conductive rods between terminals of a battery cell;
   applying a force tending to squeeze the conductive rods against each other;
   maintaining the conductive rods apart from each other using an insulating block;
   monitoring at least one operating state signal of the cell; and
   generating, based on the monitoring, a control signal to cause an insulating-block-disable element to disable the insulating block.

2. The method of claim 1 wherein disabling the insulating block comprises at least one of melting, pulverizing under the effect of an explosion, and moving the insulating block.

3. The method of claim 1 wherein the monitored state signal of the cell is representative of at least one an intensity of current flowing through the cell, a voltage between the terminals of the cell, an impedance between the terminals of the cell, and a temperature of the cell.

4. The method of claim 1 wherein the causing the insulating-block-disable element to disable the insulating block is performed upon at least one of detecting that an intensity of the current flowing through the cell is lower than a current intensity threshold, detecting that a voltage between the cell terminals is higher than a voltage threshold, detecting that an impedance between the cell terminals is higher than an impedance threshold, and detecting that a temperature of the cell is higher than a temperature threshold.

5. The method of claim 1, wherein disabling the insulating block includes at least one of electrically powering a heating element, sending an electrical signal to an explosive element, and sending a control signal to an electromechanical actuator configured to move the insulating element.

6. The method of claim 1 wherein the battery cell is a cell of a branch of a battery, the battery including several branches coupled in parallel, each branch having several battery cells coupled in series.

7. The method of claim 6, comprising:
   coupling two conductive rods between terminals of a second battery cell of the battery;
   applying a force tending to squeeze the conductive rods coupled between terminals of the second cell of the battery against each other;
   maintaining the conductive rods coupled between the terminals of the second cell of the battery apart from each other using a second insulating block;
   monitoring at least one operating state signal of the second cell, and
   selectively disabling the second insulating block based on the monitoring of the second cell to let the conductive rods coupled between the terminals of the second cell squeeze against each other.

8. The method of claim 1 wherein the insulating block comprises a fusible material and disabling the insulating block comprises activating an electrically powered heating element.

9. The method of claim 1 wherein disabling the insulating block comprises activating an explosive configured to explode in response to the control signal.

10. The method of claim 1 wherein disabling the insulating block comprises pulverizing the insulating block in response to the control signal.

11. The method of claim 1 wherein disabling the insulating block comprises activating an electromechanical actuator configured to move the insulating block to a position where the insulating block does not prevent the conductive rods from coming into contact with each other.

12. The method of claim 1 wherein the insulating block has one or more holes, each hole being configured to receive a part of one of the conductive rods.

13. The method of claim 1 wherein each conductive rod has a hole configured to receive a part of the insulating block.

14. The method of claim 1, comprising arranging one or more springs to engage another rod going through the conducting rods, the springs being arranged to squeeze the rods against the insulating block.

15. The method of claim 1 wherein the conductive rods of the battery cell are configured to short-circuit the battery cell in response to disabling of the insulating block of the battery cell.

16. The method of claim 1, comprising prestressing the conductive rods.

17. A non-transitory computer-readable medium whose contents configure a controller to perform a method, the method comprising:
   monitoring at least one operating state signal of a battery cell, the battery cell having two conductive rods coupled to terminals of the battery cell with a force tending to squeeze the conductive rods against each other, an insulating block maintaining the conductive rods apart from each other, and an insulating-block-disable element; and
   generating, based on the monitoring, a control signal to cause the insulating-block-disable element to disable the insulating block.

18. The non-transitory computer-readable medium of claim 17 wherein the monitoring comprises at least one of monitoring an intensity of current flowing through the cell, monitoring a voltage between the terminals of the cell, monitoring an impedance between the terminals of the cell, and monitoring a temperature of the cell.

* * * * *